(12) United States Patent
Jeon et al.

(10) Patent No.: US 8,423,723 B2
(45) Date of Patent: Apr. 16, 2013

(54) MULTI-PROCESSOR SYSTEM DEVICE AND METHOD DECLARING AND USING VARIABLES

(75) Inventors: Hye-ran Jeon, Suwon-si (KR);
Woo-hyong Lee, Yongin-si (KR);
Min-gyu Lee, Hwaseong-si (KR);
Woon-gee Kim, Hwaseong-si (KR);
Ji-seong Oh, Seoul (KR); Ja-gun Kwon, Seoul (KR); Taek-gyun Ko, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 410 days.

(21) Appl. No.: 12/724,671

(22) Filed: Mar. 16, 2010

(65) Prior Publication Data
US 2010/0250851 A1 Sep. 30, 2010

(30) Foreign Application Priority Data
Mar. 27, 2009 (KR) ........................ 10-2009-0026506

(51) Int. Cl.
*G06F 12/08* (2006.01)
*G06F 12/10* (2006.01)
(52) U.S. Cl.
USPC .... 711/150; 711/118; 711/152; 711/E12.066; 711/E12.017

(58) Field of Classification Search .................. 711/150, 711/118, 152, E12.066, E12.017
See application file for complete search history.

(56) References Cited

U.S. PATENT DOCUMENTS
2003/0204670 A1* 10/2003 Holt et al. ..................... 711/112
2005/0193081 A1* 9/2005 Gruber et al. ................. 709/212
2010/0161085 A1* 6/2010 Sumiya ........................... 700/86

FOREIGN PATENT DOCUMENTS
JP   2003015965 A   1/2003
JP   2007207151 A   8/2007
JP   2008198143 A   8/2008

* cited by examiner

*Primary Examiner* — Yong Choe
(74) *Attorney, Agent, or Firm* — Volentine & Whitt, PLLC

(57) ABSTRACT

A method of declaring and using variables includes; determining whether variables are independent variables or common variables, declaring and storing the independent variables in a plurality of data structures respectively corresponding to the plurality of processors, declaring and storing the common variables in a shared memory area, allowing each one of the plurality of processors to simultaneously use the independent variables in a corresponding one of the plurality of data structures, and allowing only one of the plurality of processors at a time to use the common variables in the shared memory area.

7 Claims, 4 Drawing Sheets define PerCoreInterface (var, processor_id)

```
void funcPerCoreVariable (void)
{
PerCoreInterface (x, GetCoreID( ))=3 ;
}
```

FIG. 5A

\# define var_name1 PerCoreInterface (var_name1,GetCoreID())
\# define var_name2 PerCoreInterface (var_name2,GetCoreID())

.
.

\# define var_nameN PerCoreInterface (var_nameN,GetCoreID())

FIG. 5B

```
void funcPerCoreVariable (void)
{
x=3 ;
}
```

MULTI-PROCESSOR SYSTEM DEVICE AND METHOD DECLARING AND USING VARIABLES

CROSS-REFERENCE TO RELATED APPLICATIONS

This application claims the benefit of Korean Patent Application No. 10-2009-0026506 filed on Mar. 27, 2009, the subject matter of which is hereby incorporated by reference.

BACKGROUND

The inventive concept relates to a system device, and more particularly to a system device including a plurality of processors and a related method of declaring and using variables within the system device.

As is conventionally understood, software (i.e., control programming) commonly uses a number of arbitrarily defined data values called variables. In a system device including only a single processor, the definition (i.e., "declaration") and use of one or more variables is very straightforward. However, when a system device includes a plurality of processors, each operating independently to some degree, the declaration (or re-declaration) and use of variables becomes significantly more complicated. That is, if multiple processors simultaneously change or use a changeable variable in an overlapping manner time, the possibility exists that during one or more of these simultaneous uses the variable will be invalid (e.g., a previous data value gets used by one processor while an updated data value gets used by another processor). Accordingly, some control mechanism must be established to order the declaration and use of each variable by processors in the plurality of processors.

SUMMARY

According to an aspect of the inventive concept, there is provided a method of declaring and using variables, the method comprising; determining whether variables are independent variables independently used by a plurality of processors or common variables commonly used by the plurality of processors, declaring the independent variables and storing the independent variables in a plurality of data structures respectively corresponding to the plurality of processors, declaring the common variables and storing the common variables in a shared memory area, allowing each one of the plurality of processors to simultaneously use the independent variables in a corresponding one of the plurality of data structures, and allowing only one of the plurality of processors at a time to use the common variables in the shared memory area.

According to another aspect of the inventive concept, there is provided a system device comprising; a main memory comprising a shared memory area configured to store common variables, and a plurality of data structures, each respectively configured to store independent variables, and a plurality of processors, each configured to simultaneously access independent variables stored in a corresponding one of the plurality of data structures, and each configured to access the common variables stored in the shared memory area only if no other processor in the plurality of processors is accessing the common variables.

BRIEF DESCRIPTION OF THE DRAWINGS

Embodiments of the inventive concept will be described with reference to the accompanying drawings in which:

FIG. 5A is another programming code example of a function performing macro-processing of variables according to an embodiment of the inventive concept; and FIG. 5B is yet another programming code example of a function applying a predetermined value to the macro-processed variables of FIG. 5A.

DESCRIPTION OF EMBODIMENTS

Embodiments of the inventive concept will now be described with reference to the accompanying drawings. However, it should be noted that the inventive concept may be variously embodied and is not limited to only the illustrated embodiments. Rather, the illustrated embodiments are presented as teaching examples. Throughout the written description and drawings, like reference numbers and labels are used to indicate like or similar elements.

Figure 1:
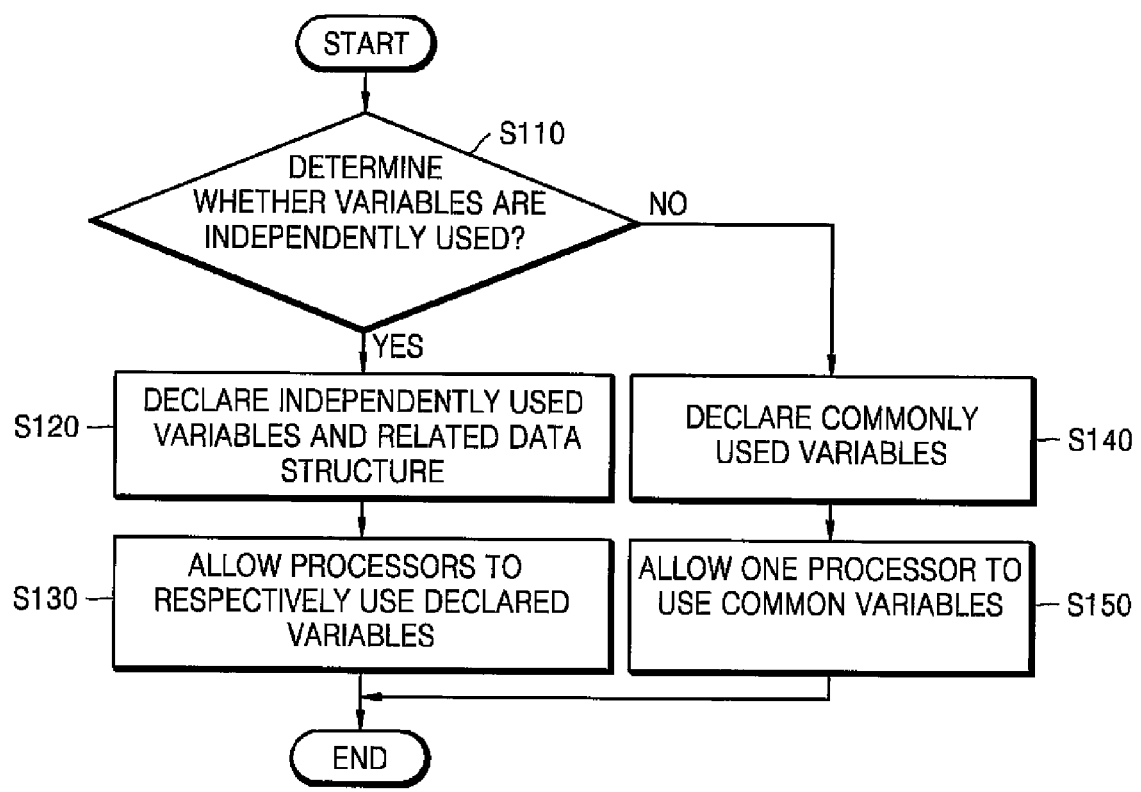
FIG. 1 is a flowchart summarizing a method of using variables according to an embodiment of the inventive concept.

FIG. 1 is a flowchart summarizing a method of declaring and using variables according to an embodiment of the inventive concept.

Referring to FIG. 1, a determination is first made as to whether certain variables are "independently used" (i.e., without a controlled interrelationship between the processor in relation to the variable) by a plurality of processors (S110). Next, if it is determined that the variables are independently used by a plurality of processors (S110=YES), the "independent variables" are declared (S120). The process of declaring the independent variables includes the steps of storing each independent variable in a designated "independent data structure", and thereafter declaring the independent data structure within a main memory (i.e., a memory commonly accessible to the plurality of processors).

For example, if there are "N" processors, where N is a natural number, independent variables associated with the N processors may be declared within a data array as N data array elements. With this definition, an independent variable stored in the data array as an Ith array element, where "I" is a natural number less than N, will be understood as an independent variable used by the Ith processor in the plurality of 1 to N processors. This type of data array including N array elements may be readily stored in the main memory. Following the declaration of independent variables and their related data structure, each one of the plurality of processors may respectively use its independent variables stored in the related data structure (S130).

However, if it is determined that certain variables are not independently used by a plurality of processors (S110=NO), then these variables are declared to be "common variables" (S140). Common variables may be stored in a shared area of the main memory. Following definition of the common variables, only a single one of the plurality of processors at a time may use the common variables stored in the shared area.

Figure 2:
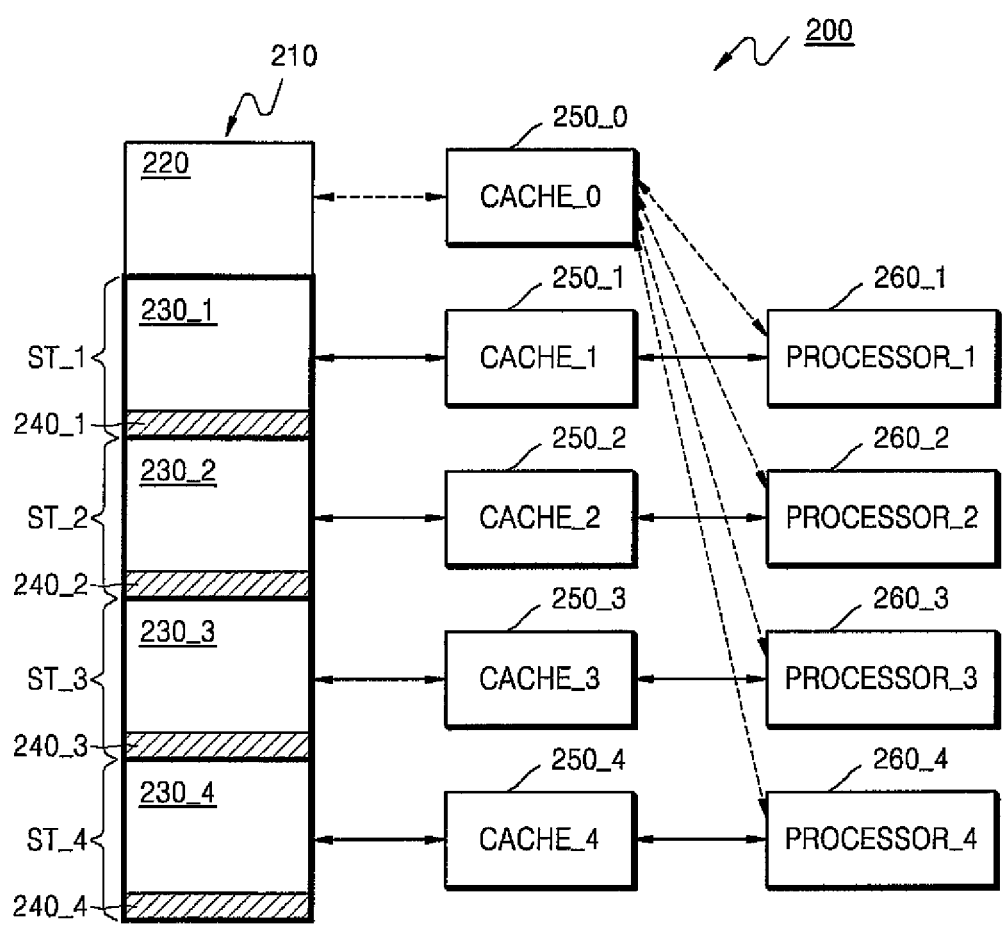
FIG. 2 is a block diagram of a system device according to an embodiment of the inventive concept.

FIG. 2 is a block diagram of a system device 200 according to an embodiment of the inventive concept.

Referring to FIG. 2, the system device 200 comprises a main memory 210, and a plurality of processors 260_1, 260_2, 260_3, and 260_4. Although the first through fourth processors 260_1, 260_2, 260_3, and 260_4 use variables stored in the main memory 210 in FIG. 2, the inventive concept is not limited thereto and any reasonable number of processors may be used.

The main memory 210 includes a shared area 220 and a plurality of areas in which a data structure (ST) may be stored (i.e., first through fourth data structures ST_1, ST_2, ST_3, and ST_4). In the illustrated example, it is assumed that the first through fourth data structure ST_1, ST_2, ST_3, and ST_4 correspond to the first through fourth processors 260_1, 260_2, 260_3, and 260_4, respectively.

Variables that are commonly used by the first through fourth processors 260_1, 260_2, 260_3, and 260_4 may be declared and stored in the shared area 220. For example, it is assumed that variables that are commonly used by the first through fourth processors 260_1, 260_2, 260_3, and 260_4 include variable 'A' and a variable 'B'. According to the embodiments of FIGS. 1 and 2, the variables 'A' and 'B' are declared and stored in the shared area 220.

Variables that are independently used by the first through fourth processors 260_1, 260_2, 260_3, and 260_4 are declared and stored in corresponding first through fourth data structures ST_1, ST_2, ST_3, and ST_4. Thus, an array of data structures includes the first through fourth data structure ST_1, ST_2, ST_3, and ST_4. For example, it is assumed that the variables that are independently used by the first through fourth processors 260_1, 260_2, 260_3, and 260_4 include a variable 'X', a variable 'Y', and a variable 'Z'. According to the embodiments of FIGS. 1 and 2, the independent variables 'X', 'Y', and 'Z' are declared and included in each one of the first through fourth data structures ST_1, ST_2, ST_3, and ST_4. That is, the declared independent variables 'X', 'Y', and 'Z' are included in the first data structure ST_1, the second data structure ST_2, the third data structure ST_3, and the fourth data structure ST_4.

The number of data structures in the illustrated example is equal to the number of the plurality of processors. That is, since the system device 200 includes the first through fourth processors 260_1, 260_2, 260_3, and 260_4 in FIG. 2, the first through fourth data structures ST_1, ST_2, ST_3, and ST_4 are stored in the main memory 210. However, the inventive concept is not limited to this arrangement and number. But certain embodiments of the inventive concept will use a one-for-one relationship between the plurality of processors and corresponding data structures.

An area in which the first data structure ST_1 is stored includes a first reserve area 240_1 and a first variable area 230_1 in which the declared independent variables are stored. An area in which the second data structure ST_2 is stored includes a second reserve area 240_2 and a second variable area 230_2 in which the declared independent variables are stored. Likewise, an area in which the third data structure ST_3 is stored include a third reserve area 240_3 and a third variable area 230_3 in which the declared independent variables are stored, and an area in which the fourth data structure ST_4 is stored includes a fourth reserve area 240_4 and a fourth variable area 230_4 in which the declared independent variables are stored. The first through fourth reserve areas 240_1, 240_2, 240_3, and 240_4 will be explained in some additional detail with reference to FIG. 3.

The system device 200 of FIG. 2 further comprises a plurality of cache memories 250_1, 2502, 250_3, and 250_4. In the illustrated example, the first through fourth cache memories 250_1, 250_2, 250_3, and 250_4 correspond to the first through fourth processors 260_1, 260_2, 260_3, and 260_4, respectively.

A method of declaring and using both common and independent variables within the system device 200 will now be explained in some additional detail with reference to FIGS. 1 and 2.

It is first determined whether variables are independently or commonly used by the first through fourth processors 260_1, 260_2, 260_3, and 260_4 (S110). Variables commonly used by the first through fourth processors 260_1, 260_2, 260_3, and 260_4 (S110=NO) are declared and stored in the shared area 210 of the main memory 210 (S140), while variables independently used by the first through fourth processors 260_1, 260_2, 260_3, and 260_4 are separately declared and stored within respectively data structures forming a collective data structure array ST, including (e.g.) the first through fourth data structures ST_1, ST_2, ST_3, and ST_4 stored in the main memory 210 (S120).

A method of using the independent variables by the first through fourth processors 260_1, 260_2, 260_3, and 260_4 will now be explained. If the first processor 260_1 needs to use independent variables stored in the first data structure ST_1, the variables stored in the first data structure ST_1 will be transferred to the first cache memory 250_1. The first processor 260_1 will then access the independent variables from the first cache memory 250_1. This approach is similarly used by the second processor 260_2, the third processor 260_3, and the fourth processor 260_4.

A method of using the common variables by the first through fourth processors 260_1, 260_2, 260_3, and 260_4 will now be explained. After declaring the common variables (S140), only one of the first through fourth processors 260_1, 2602, 2603, and 260_4 is allowed to access the common variables stored in the shared area 220 at one time. For example, if the second processor 260_2 needs to use one or more common variables stored in the shared area 220, it gains access to the shared area 220 only after determining that no other processor is currently accessing the common variables (S150). If it is determined that no other processor is currently accessing the common variables, the second processor 260_2 informs the other processors that it is currently accessing the common variables, and the variables are then transferred to the second cache memory 250_2. The second memory 260_2 may then use the common variables stored in the second cache memory 250_2. Once the second processor 260_2 has completed its use of the common variables, it informs the other processors that it is done, thus freeing access of the common variable to the other processors.

As described above, according to the inventive concept, since variables, which are independently used by a plurality of processors, are stored in a structure array including a plurality of structure array elements corresponding in number to the plurality of processors, variables stored in the structure array elements corresponding to the plurality of processors can be easily found and used. For example, according to an embodiment of the inventive concept, variables stored in a structure array element can be found using identification (ID) information of a processor corresponding to the structure array element without calculating an offset. The ID information of the processor may be checked by using a hardware register.

Figures 3, 4A, 4B:
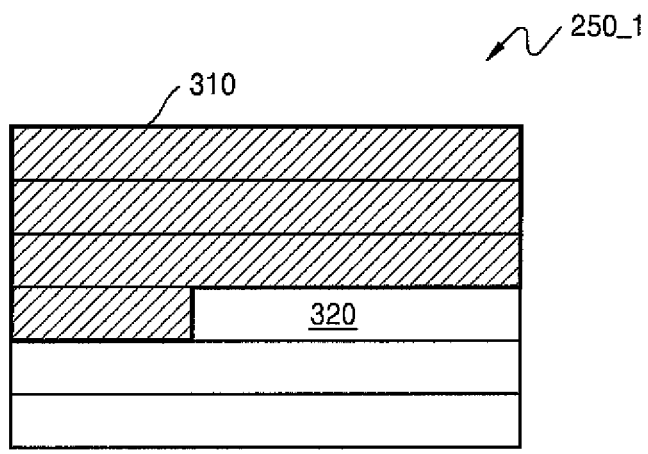
FIG. 3 conceptually illustrates a first cache memory of the system device shown in FIG. 2.
FIG. 4A is programming code example for a macro function defining an ordered variable find function according to an embodiment of the inventive concept.
FIG. 4B is another programming code example of a function applying a predetermined value to variables using the macro function of FIG. 4A.

FIG. 3 conceptually illustrates the first cache memory 250_1 of the system device 200 of FIG. 2.

Although the first cache memory 250_1 includes only six (6) data segments in FIG. 3, the inventive concept is not limited thereto, and each of the first through fourth cache memories 250_1, 250_2, 250_3, and 250_4 may include any reasonable number of data segments. The first cache memory 250_1 is explained as an example of the second through fourth cache memories 250_2, 250_3, and 250_4.

A method of storing and accessing independent variables, as declared and stored in the first data structure ST_1 and in the first cache memory 250_1 will now be explained with reference to FIGS. 2 and 3. It is assumed that independent variables stored in the first variable area 230_1 of the first data structure ST_1 are stored in a first data segment area 310 in the first cache memory 250_1. It is further assumed that the first cache memory 250_1 stores and removes data on a data segment by data segment basis. Accordingly, if the independent variables stored in the first structure array element 260_1 need to be stored in the first cache memory 250_1, both the data segment areas 310 and 320 of the first cache memory 250_1 may be updated. In this case, the first data structure ST_1 is stored in the first data segment area 310, and data stored in relation to (i.e., adjacent to) the first data structure ST_1 in the main memory 210 is stored in the second data segment area 320. For example, if there is no first reserve area 240_1 between the first variable area 230_1 and the second variable area 230_2 in FIG. 2, a portion of the data stored in the second variable area 230_2 may be stored in the second data segment area 320. If the portion of data stored in the second variable area 230_2 is stored in the second data segment area 320, since data is stored on a data segment (i.e., a data line) by data segment basis, all data segment to which the second data segment area 320 belongs should be removed in order to clear the second data segment area 320, and a portion of the data stored in the first data structure ST_1 may be removed.

However, the first data structure ST_1 illustrated in system device 200 of FIG. 2 may further comprise the first reserve area 240_1 separately the second data segment area 320 from the first data segment area 310 in the first cache memory 320_1. Thus, the first reserve area 240_1 is defined as an area of the first cache memory 320_1 not including data. Accordingly, the variables stored in the first variable area 230_1 are stored in the first segment area 310 of the first cache memory 250_1, and previously stored data is removed and no data is stored in the second data segment area 320.

To this end, the size of the first reserve area 240_1 may be determined so that the size of the first data structure ST_1 matches the size of a predetermined number of data segments of the first cache memory 250_1. That is, the size of the first reserve area 240_1 may be determined so that the size of the first data structure ST_1 corresponds to the size of the first data segment area 320 of the first cache memory 250, other than the first data segment area 310 in which the variables declared in the first variable area 230_1 are stored.

FIG. 4A is a programming code example for a macro function defining an ordered variable find function according to an embodiment of the inventive concept, and FIG. 4B is another programming code example of a function applying a predetermined value to variables using the macro function of FIG. 4A;

Referring to FIGS. 4A and 4B, in order for each of the plurality of processors to easily access independent and common variables, this type of macro function may be defined and used. In FIG. 4B, the bracketed portion (i.e., bounded by { ... }) may be used to declare variables to be included in a particular data structure (e.g., PerCore gPerCore [NUM_PROCESSOR] declares a structure array, and defines a macro function PerCoreInterface). In FIG. 4B, the value "3" is designated to a variable 'x' by using the macro function. If a predetermined value is designated to a variable by using the macro function as shown in FIG. 4B, variables of a structure corresponding to a currently operating processor can be easily found and the predetermined value can be applied to the variable.

FIG. 5A is another programming code example of a function performing macro-processing of variables according to an embodiment of the inventive concept, and FIG. 5B is yet another programming code example of a function applying a predetermined value to the macro-processed variables of FIG. 5A.

Referring to FIGS. 4A, 5A, and 5B, in order for each of the plurality of processors to easily use variables, the variables may be macro-processed and used as shown in FIG. 5A. If the macro function PerCoreInterface is defined as shown in FIG. 4A, in FIG. 5A, the variables are macro-processed by using the macro function PerCoreInterface, and in FIG. 5B, 3 is designated to a variable 'x'. Even when a predetermined value is designated to a macro-processed variable as shown in FIG. 5B, variables of a structure corresponding to a currently operating processor can be easily found and the predetermined value can be designated. That is, since variables are macro processed in FIGS. 5A and 5B, predetermined values can be easily designated to the variables without using a macro function, which is different from FIGS. 4A and 4B.

Accordingly, predetermined values can be more easily designated to variables by using the method of FIGS. 4A and 4B, or the method of FIGS. 5A and 5B. That is, variables can be easily used by using the method of FIGS. 4A and 4B, or the method of FIGS. 5A and 5B, without calculating an offset or correcting an existing code. However, the inventive concept is not limited to the application of predetermined values to variables by using the methods of FIGS. 4A through 5B.

While the inventive concept has been particularly shown and described with reference to exemplary embodiments thereof using specific terms, the embodiments and terms have been used to explain the inventive concept and should not be construed as limiting the scope of the inventive concept defined by the claims. The preferred embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A method of declaring and using variables, the method comprising:
   determining whether variables are independent variables independently used by a plurality of processors or common variables commonly used by the plurality of processors;
   declaring the independent variables and storing the independent variables in a plurality of data structures respectively corresponding to the plurality of processors;
   declaring the common variables and storing the common variables in a shared memory area;
   allowing each one of the plurality of processors to simultaneously use the independent variables in a corresponding one of the plurality of data structures; and
   allowing only one of the plurality of processors at a time to use the common variables in the shared memory area,
   wherein allowing each one of the plurality of processors to simultaneously use the independent variables in a corresponding one of the plurality of data structures comprises transferring independent variables stored in one of the plurality of data structures to a cache corresponding to one of the plurality of processors accessing the one of the plurality of the data structures, and wherein a size of the one of the plurality of data structures matches a size of one or more data segment in the cache.

2. The method of claim 1, further comprising defining as first data segment area, a second data segment area, and a reserve area separating the first and second data segment areas in the cache.

3. The method of claim 2, further comprising; defining a macro function used to find declared variables stored in one or more of the plurality of data structures.

4. The method of claim 2, further comprising; macro-processing the declared variables using the macro function.

5. A system device comprising:

a main memory comprising a shared memory area configured to store common variables, and a plurality of data structures, each respectively configured to store independent variables;

a plurality of processors, each configured to simultaneously access independent variables stored in a corresponding one of the plurality of data structures, and each configured to access the common variables stored in the shared memory area only if no other processor in the plurality of processors is accessing the common variables; and a plurality of cache memories respectively corresponding to the plurality of processors and each comprising one or more data segments, wherein each of the data structures comprises a reserve area such that a size of each one of the plurality of data structures matches a size of one or more data segments in a corresponding cache memory.

6. A system device comprising:

a main memory comprising a shared memory area configured to store common variables, and a plurality of data structures, each respectively configured to store independent variables;

a plurality of processors, each configured to simultaneously access independent variables stored in a corresponding one of the plurality of data structures, and each configured to access the common variables stored in the shared memory area only if no other processor in the plurality of processors is accessing the common variables;

wherein each one of the plurality of processors is configured to perform a macro function capable of finding declared variables stored in at least one of the plurality of data structures.

7. The system device of claim 6, wherein the declared variables are macro-processed in the main memory by using the macro function.

* * * * *